United States Patent
Goetting

(10) Patent No.: US 8,857,272 B2
(45) Date of Patent: Oct. 14, 2014

(54) METHOD FOR DETERMINING THE TORQUE OF AN ELECTRIC MOTOR

(75) Inventor: Gunther Goetting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 13/637,735

(22) PCT Filed: May 4, 2011

(86) PCT No.: PCT/EP2011/057138
§ 371 (c)(1),
(2), (4) Date: Dec. 11, 2012

(87) PCT Pub. No.: WO2011/160880
PCT Pub. Date: Dec. 29, 2011

(65) Prior Publication Data
US 2013/0074609 A1    Mar. 28, 2013

(30) Foreign Application Priority Data

Jun. 22, 2010   (DE) .......................... 10 2010 030 365

(51) Int. Cl.
| | | |
|---|---|---|
| G01L 3/14 | (2006.01) | |
| H02P 23/14 | (2006.01) | |
| B60K 6/48 | (2007.10) | |
| G01L 3/04 | (2006.01) | |
| G01L 3/10 | (2006.01) | |
| B60W 20/00 | (2006.01) | |

(52) U.S. Cl.
CPC ............ G01L 3/04 (2013.01); B60W 2510/083 (2013.01); Y02T 10/642 (2013.01); H02P 23/14 (2013.01); B60W 20/00 (2013.01); B60K 6/48 (2013.01); B60L 2240/423 (2013.01); G01L 3/109 (2013.01); Y02T 10/6221 (2013.01)
USPC .................................................... 73/862.321

(58) Field of Classification Search
USPC ..................................................... 73/862.321
See application file for complete search history.

(56) References Cited

U.S. PATENT DOCUMENTS

| | | | |
|---|---|---|---|
| 5,754,967 A | 5/1998 | Inoue et al. | |
| 7,559,259 B2 * | 7/2009 | Fruhwirth et al. | ........ 73/862.321 |
| 8,594,878 B2 * | 11/2013 | Merkel et al. | .................... 701/22 |
| 2009/0115362 A1 | 5/2009 | Saha et al. | |

FOREIGN PATENT DOCUMENTS

| | | |
|---|---|---|
| DE | 10 2004 013516 | 10/2005 |
| DE | 10 2008 02650 | 12/2009 |
| WO | 2004/097359 | 11/2004 |

* cited by examiner

*Primary Examiner* — Lisa Caputo
*Assistant Examiner* — Octavia D. Hollington
(74) *Attorney, Agent, or Firm* — Kenyon & Kenyon LLP

(57) ABSTRACT

Method for determining torque of an electric motor on a vehicle, a torque being generated by an electric motor rotor and being transmitted from a drivetrain to at least one drive wheel, including: measuring the rotor rotation angle, determining the torque generated by the rotor, the at least one drive wheel driven by the rotor being fixed, the stationary rotor not generating any torque and a first rotation angle of the stationary rotor being measured, subsequently a torque applied by the rotor to the drivetrain, so that the rotor performs rotational movement due to the drivetrain stiffness, and subsequently, in an equilibrium state between the torque generated by the rotor and a counter torque of the drivetrain, a second rotation angle of the rotor being measured, the torque generated by the rotor and/or the total stiffness of the drivetrain being ascertained from the measured values of the rotor rotation angles.

11 Claims, 3 Drawing Sheets

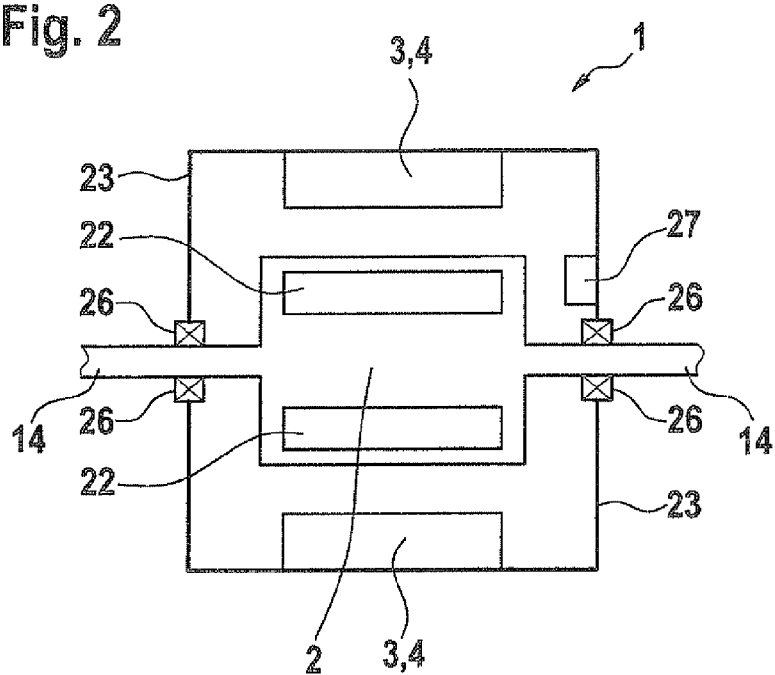
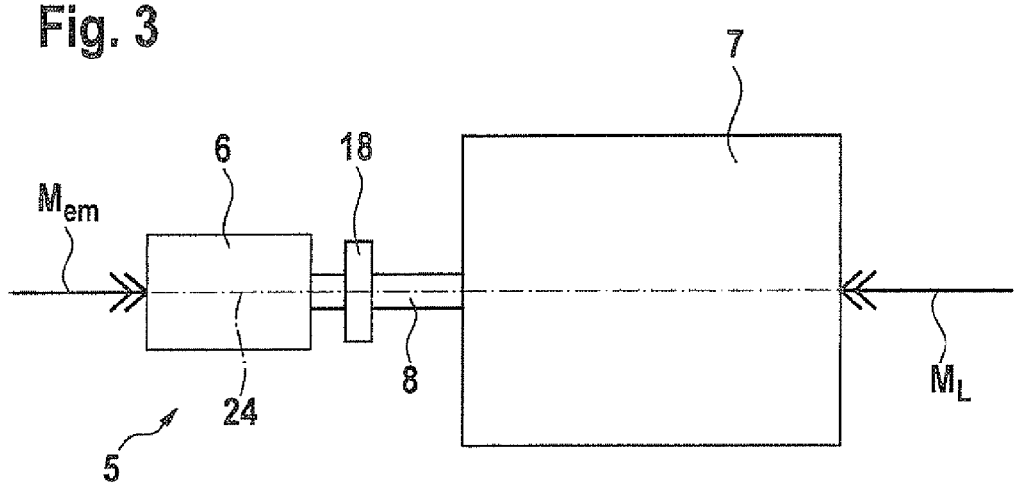

METHOD FOR DETERMINING THE TORQUE OF AN ELECTRIC MOTOR

FIELD OF THE INVENTION

The present invention relates to a method for determining the torque of an electric motor and a drivetrain for a motor vehicle.

BACKGROUND INFORMATION

Electric motors are used for various technical applications. For example, in electric or hybrid vehicles, electric motors are used for driving a motor vehicle. Continuous and precise detection of the torque generated by the electric motor is necessary for the use of electric motors in motor vehicles, in order to be able to avoid inadvertent accelerations or decelerations of the motor vehicle. For this purpose, the torque is determined from the measured phase currents of the electromagnets of the electric motor and the rotation angle of the rotor of the electric motor using a machine model. The machine model contains operation-dependent parameters, e.g., the temperature of the stator and the rotor or the rotor flux, which must be complexly adapted. Errors or inaccuracies in the calculation path of the machine model result in incorrectly ascertained torques, which may have safety-relevant consequences for the motor vehicle. For this reason, there are methods for performing a plausibility check of the torque calculated using the machine model from measured values of the voltage and the current, the torque therefore being disadvantageously dependent on the precision and functionality of the sensors for these measured values.

A method for operating a variable-speed electric motor, in particular a brushless servo motor, is discussed in DE 41 22 391 A1. By regulating the motor variables current, position angle, and speed, the speed is determined from the position angle measured with the aid of a position sensor by a filter.

SUMMARY OF THE INVENTION

A method according to the present invention for determining the torque of an electric motor on a motor vehicle, a torque being generated by a rotor of the electric motor and the torque being transmitted from a drivetrain to at least one drive wheel, including the following steps: measuring the rotation angle of a rotor of the electric motor, determining the torque generated by the rotor, the at least one drive wheel driven by the rotor being fixed, the stationary rotor not generating any torque, and a first rotation angle of the stationary rotor being measured, a torque subsequently being applied by the rotor to the drivetrain, so that the rotor carries out a rotational movement due to the limited stiffness of the drivetrain and subsequently, in an equilibrium state between the torque generated by the rotor and a counter torque of the drivetrain, a second rotation angle of the rotor being measured, the torque generated by the rotor and/or the total stiffness of the drivetrain being ascertained from the measured values of the first and second rotation angles of the rotor. The torque of the electric motor may therefore advantageously be determined without measured values for the current or the voltage of the electric motor being necessary, and therefore no errors occur due to a lack of precision or functionality of the sensors for the measured values.

In one variant, the torque generated by the rotor and/or the total stiffness of the drivetrain is/are ascertained using a physical model.

In another specific embodiment, the physical model is a dual-mass oscillator having a first mass with a rotational moment of inertia of the rotor of the electric motor, a second mass having a second equivalent rotational moment of inertia, and a torsion bar spring as the drivetrain between the first mass and the second mass.

The drivetrain advantageously includes a transmission and/or a drive shaft and/or a differential and/or a converter, by which the torque is transmitted from the electric motor to the at least one drive wheel.

In another embodiment, the rotational moment of inertia of the first mass and the equivalent rotational moment of inertia of the second mass are determined for the physical model.

In a supplementary specific embodiment, the at least one drive wheel, in particular all drive wheels, do not carry out any rotational movement between the points in time of the measurement of the first rotation angle and the second rotation angle of the rotor.

The total stiffness of the torsion bar spring is advantageously set equal to the total stiffness of the drivetrain between the electric motor and the at least one parking brake.

In another variant, the equivalent rotational moment of inertia of the second mass also includes, in addition to the rotational moment of inertia of the at least one drive wheel, the fictional rotational moment of inertia of the motor vehicle, the fictional rotational moment of inertia of the motor vehicle being calculated from the translational moment of inertia of the motor vehicle.

In particular, when the at least one parking brake is disengaged, the drivetrain transmits the torque of the electric motor from the electric motor to the at least one drive wheel and, when the at least one parking brake is engaged, the drivetrain transmits the torque of the electric motor from the electric motor to the at least one parking brake.

The second angle of the rotor may be measured in the equilibrium state when the rotor is essentially stationary. An essentially stationary rotor means that the angular velocity of the rotor is less than one revolution per minute.

In another specific embodiment, the torque generated by the rotor and/or the total stiffness of the drivetrain is/are ascertained using an equation, the equation may read $M_{e1} = (c/u^2)*(\phi_{R2} - \phi_{R1})$ and $M_{e1}$ being the torque of electric motor (1) in this case, c being the total stiffness of the drivetrain, u being the transmission ratio of the transmission, $\phi_{R2}$ being the second rotation angle of the rotor, and $\phi_{R1}$ being the first rotation angle of the rotor.

A drive unit according to the present invention, in particular an electric or hybrid drive unit, for a motor vehicle, including: an electric motor having a sensor for detecting the rotation angle of a rotor of the electric motor, which may be a control unit, which may be an internal combustion engine, a drivetrain, at least one drive wheel, a parking brake for the at least one drive wheel, a method described in the present application being executable therein.

The sensor is a resolver or a digital sensor in particular.

An exemplary embodiment of the present invention is described in greater detail hereafter with reference to the appended drawings.

BRIEF DESCRIPTION OF THE DRAWINGS

FIG. 2 shows a longitudinal section of an electric motor.
FIG. 3 shows a view of a dual-mass oscillator.

DETAILED DESCRIPTION

Figure 1:
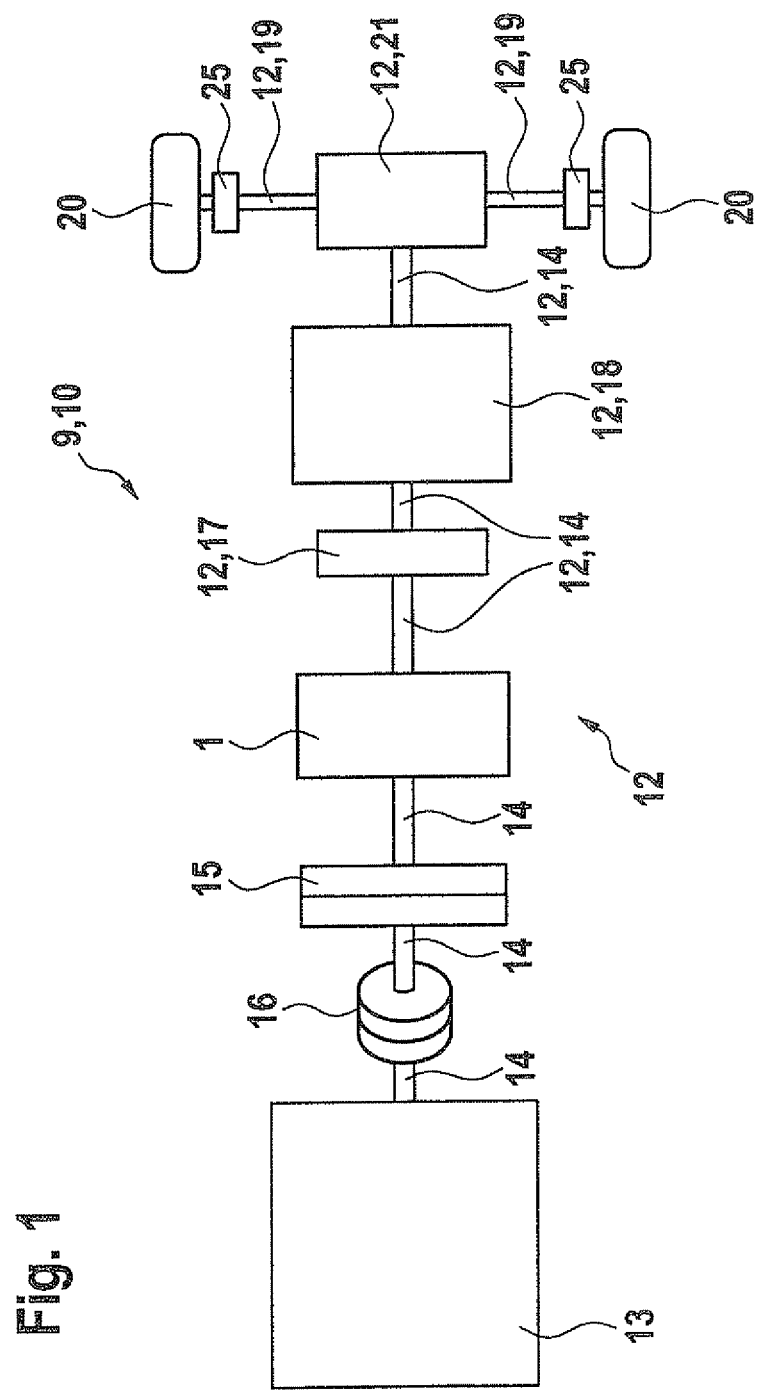
FIG. 1 shows a highly schematic view of a drive unit.
Figure 4:
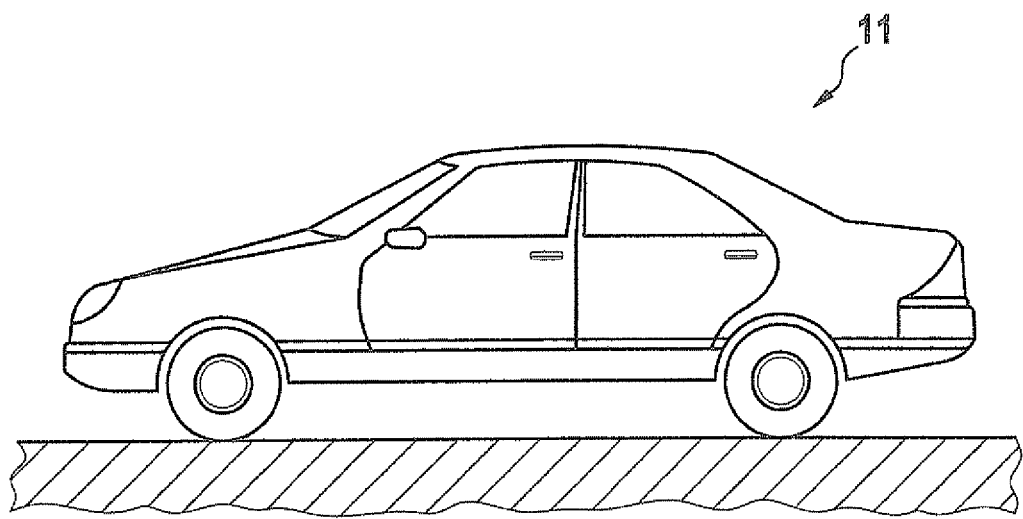
FIG. 4 shows a side view of a motor vehicle.

A drive unit 9, which is configured as a hybrid drive unit 10, for a motor vehicle 11 is shown in FIG. 1. Hybrid drive unit 10 for motor vehicle 11 includes an internal combustion engine 13 and an electric motor 1 for driving motor vehicle 11. Internal combustion engine 13 and electric motor 1 are connected to one another with the aid of a drive shaft 14. The mechanical coupling between internal combustion engine 13 and electric motor 1 may be established and canceled with the aid of a clutch 15. Furthermore, an elasticity 16 is situated in drive shaft 14, which couples internal combustion engine 13 and electric motor 1 to one another. Electric motor 1 is mechanically coupled to a differential 21. A converter 17 and a transmission 18 are arranged in drive shaft 14, which connects electric motor 1 and differential 21 to one another. With the aid of differential 21, drive wheels 20 are driven by half shafts 19. The two drive wheels 20 may be braked or fixed using one parking brake 25 each, so that if motor vehicle 11 is stopped and parking brakes 25 are engaged, no (rotational) movement of drive wheels 20 is possible even if a torque is applied by electric motor 1; drive wheels 20 are therefore stationary. Notwithstanding this, only one parking brake 25 may also be situated on drive shaft 14 between transmission 18 and differential 21 (not shown).

FIG. 2 shows a longitudinal section of electric motor 1. Electric motor 1 has a rotor 2 and a stator 3 having electromagnets 4 as coils 4. Rotor 2 forms, together with drive shaft 14, an assembly, and permanent magnets 22 are situated on rotor 2. Electromagnets 4 of stator 3 are mounted on a housing 23 of electric motor 1 and housing 23 is mounted using a mount 26 on drive shaft 14. Electric motor 1 is additionally equipped with a sensor 27, which is configured as a digital sensor, for detecting the rotation angle of rotor 2 or drive shaft 14. Rotation angle $\phi_R$ of rotor 2 is measured with the aid of sensor 27.

FIG. 3 shows a dual-mass oscillator 5. Dual-mass oscillator 5 is a rotational oscillator, whose first mass 6 and second mass 7 fictitiously carry out a rotational movement around a rotational axis 24. First mass 6 is connected to second mass 7 with the aid of a torsion bar spring 8. Rotational moment of inertia $J_R$ of first mass 6 corresponds to rotational moment of inertia $J_R$ of electric motor 1 or rotor 2 of electric motor 1. In the components of drivetrain 12 shown in FIG. 1, for example, drive shaft 14, parts of converter 17 and transmission 18, parts of differential 21, half shaft 19, and drive shaft 14 carry out a rotational movement. The rotational moment of inertia of these components is known because of the design layout of motor vehicle 11 and may be calculated. Motor vehicle 11 may carry out a translational movement. During a translational movement of motor vehicle 11, a mass moment of inertia occurs. This mass moment of inertia of the mass of motor vehicle 11, which carries out a translational movement, is converted into an equivalent rotational moment of inertia $J_F$ of motor vehicle 11. Equivalent rotational moment of inertia $J_F$ of second mass 7 in dual-mass oscillator 5 corresponds to the equivalent moment of inertia, which is converted from the mass moment of inertia of motor vehicle 11 with a translational movement, and to the rotational moment of inertia of the components of drivetrain 12 with a rotational movement and drive wheels 20. In this model, drivetrain 12 represents the components of drive unit 9 between electric motor 1 and the at least one parking brake 25, two parking brakes 25 here, i.e., drive shaft 14 from electric motor 1 to differential 21, half shafts 19, converter 17, and transmission 18. Drivetrain 12 does not have a device in which a slip occurs, e.g., a clutch 15 in which a slip exists between the two clutch discs. Transmission 18 has a transmission ratio of, e.g., u=10, i.e., in the event of 10 revolutions of rotor 2 or drive shaft 14 between electric motor 1 and transmission 18, drive shaft 14 between transmission 18 and differential 21 carries out one revolution. If drivetrain 12 does not have a transmission 18, u=1.

In this physical model of dual-mass oscillator 5, the two differential equations 1a and 1b apply:

$$J_R^* \phi''_R = M_{em} - c/u^*(\phi_R/u - \phi_F) - d/u^*(\phi'_R/u - \phi'_F) \quad (1a)$$

$$J_F^* \phi''_F = c/u^*(\phi_R/u - \phi_F) - d/u^*(\phi'_R/u - \phi'_F) - M_L \quad (1b)$$

In this case, $\phi_R$ is the rotation angle of first mass 6 or rotor 2, $\phi'_R = d\phi_R/dt$ is the angular velocity of first mass 6, and $\phi''_R = d\phi'_R/dt$ is the angular acceleration of first mass 6. Similarly, $\phi_F$ is the rotation angle of second mass 7, $\phi'_F = d\phi_F/dt$ is the angular velocity of second mass 7, and $\phi''_F = d\phi'_F/dt$ is the angular acceleration of second mass 7. Torsion bar spring 8 has total stiffness c and total damping d, which correspond to total stiffness c and total damping d of drivetrain 12 between electric motor 1 and the two parking brakes 25.

Motor vehicle 11 is stationary, so that drive wheels 20 do not carry out a rotational movement and drive wheels 20 are fixed using the two parking brakes 25. Electric motor 1 does not generate a torque $M_{e1}$, rotor 2 is stationary and a first rotation angle $\phi_{R1}$ of rotor 2 is detected. After the fixing of the two drive wheels 20, a torque $M_{e1}$ is applied using electric motor 1 to drive shaft 14 and this torque $M_{e1}$ causes a torsion of drivetrain 12 or torsion bar spring 8 because of limited total stiffness c, since the total stiffness is not infinite. In particular drive shaft 14 and half shafts 19 are twisted. Drivetrain 12 or torsion bar spring 8 applies a counter torque $M_L$ or a load torque $M_L$ to rotor 2 until, in an equilibrium state, angular velocity $\phi'_R = d\phi_R/dt$ of first mass 6 or rotor 2 is equal to zero. A second rotation angle $\phi_{R2}$ of rotor 2 is detected in this equilibrium state.

Therefore, angular acceleration $\phi''_R = d\phi'_R/dt$ of first mass 6 or rotor 2 is also equal to zero and therefore in differential equation (1a), $J_R^* \phi''_R = 0$. Furthermore, in addition to angular velocity $\phi'_R = d\phi_R/dt$ of first mass 6 or rotor 2, the angular velocity of second mass 7 is also $\phi'_F = d\phi_F/dt = 0$, so that also in differential equation (1a), $d/u^*(\phi'_R/u - \phi'_F) = 0$. The following equation (2) therefore arises in the equilibrium state for $M_{em}$:

$$M_{em} = c/u^*(\phi_R/u - \phi_F) \quad (2)$$

In this equation, $\phi_F = 0$, because drive wheels 20 are fixed and therefore have not established a rotation angle. $\phi_R$ is the difference of second and first detected rotation angles $\phi_R$, i.e., rotation angle $\phi_R$ of rotor 2 or first mass 6 in the case of fixed drive wheels 20 until the equilibrium state.

Therefore, the equation (3) arises:

$$M_{em} = (c/u)^{2*}(\phi_{R2} - \phi_{R1}) \quad (3)$$

The transmission ratio is a known variable and total stiffness c of drivetrain 12 is a mechanical parameter, which either may be calculated from the design data and/or may be determined using measurements.

Equations (2) and (3) therefore allow the calculation of torque $M_{em}$ of electric motor 1 independently of measured values for the voltage and the current on electric motor 2 and parameters of a machine model for electric motor 1.

Torque $M_{em}$ of electric motor 1, which is calculated using equations (2) and (3), may be used, e.g., for a calibration of the parameters of a machine model, for a calibration of the current sensor system of electric motor 1, or for a determination of total stiffness c of drivetrain 12, if torque $M_{em}$ is known.

Considered as a whole, significant advantages are connected with the method according to the present invention and drive unit 9 according to the present invention. Torque $M_{em}$, generated by electric motor 1 may be determined in a simple way, without complex and error-prone machine models of electric motor 1 being required. Only a brief stoppage of motor vehicle 11 is necessary; therefore, it may be carried out with motor vehicle 11 on a test stand, for example, or also during a brief stoppage of motor vehicle 11 at a traffic light during normal driving operation, if parking brakes 25 are briefly operated by the controller of motor vehicle 11 during the stoppage and, during the operation of the parking brakes, for a period of time of less than one second, e.g., in the range of 300 ms to 500 ms, torque $M_{em}$ is generated by electric motor 1, the difference between second and first detected rotation angles $\phi_R$ may therefore be measured. The method may be used for all types of electric motors 1, e.g., GM, ASM, PSM, or GRM.

What is claimed is:

1. A method for determining a torque of an electric motor on a motor vehicle, the torque being generated by a rotor of the electric motor, and the torque being transmitted from a drivetrain to at least one drive wheel, the method comprising:
    measuring a rotation angle of the rotor of the electric motor;
    determining the torque generated by the rotor;
    wherein the at least one drive wheel driven by the rotor is fixed, a stationary rotor does not generate any torque, and a first rotation angle of the stationary rotor is measured, and subsequently,
    wherein a torque is applied by the rotor to the drivetrain, so that the rotor carries out a rotational movement due to the limited stiffness of the drivetrain, and subsequently
    in an equilibrium state between the torque generated by the rotor and a counter torque of the drivetrain, a second rotation angle of the rotor is measured, and
    wherein at least one of the torque generated by the rotor and the total stiffness of the drivetrain is ascertained from the measured values of a first rotation angle and a second rotation angle of the rotor.

2. The method of claim 1, wherein at least one of the torque generated by the rotor and a total stiffness of the drivetrain is ascertained using a physical model.

3. The method of claim 2, wherein the physical model is a dual-mass oscillator having a first mass with a rotational moment of inertia of the rotor of the electric motor, a second mass having a second equivalent rotational moment of inertia, and a torsion bar spring as the drivetrain between the first mass and the second mass.

4. The method of claim 1, wherein the drivetrain includes at least one of a transmission, a drive shaft, a differential, and a converter, by which a torque is transmitted from the electric motor to the at least one drive wheel.

5. The method of claim 1, wherein the at least one drive wheel do not carry out any rotational movements between the points in time of the measurement of the first and second rotation angles of the rotor.

6. The method of claim 3, wherein the total stiffness of the torsion bar spring is set equal to a total stiffness of the drivetrain between the electric motor and the at least one parking brake.

7. The method of claim 1, wherein, if the at least one parking brake is disengaged, the drivetrain transmits the torque of the electric motor from the electric motor to the at least one drive wheel, and, if the at least one parking brake is engaged, the drivetrain transmits the torque of the electric motor from the electric motor to the at least one parking brake.

8. The method of claim 1, wherein the second angle of the rotor is measured with an essentially stationary rotor in the equilibrium state.

9. The method of claim 1, wherein at least one of the torque generated by the rotor and a total stiffness of the drivetrain is ascertained using an equation.

10. A drive unit, which is a hybrid drive unit, for a motor vehicle, comprising:
    an electric motor having a sensor for detecting a rotation angle of a rotor of the electric motor;
    an internal combustion engine;
    a drivetrain;
    at least one drive wheel;
    a parking brake for the at least one drive wheel; and
    a control arrangement configured to perform the following:
        measuring a rotation angle of the rotor of the electric motor;
        determining the torque generated by the rotor;
        wherein the at least one drive wheel driven by the rotor is fixed, a stationary rotor does not generate any torque, and a first rotation angle of the stationary rotor is measured, and subsequently,
        wherein a torque is applied by the rotor to the drivetrain, so that the rotor carries out a rotational movement due to the limited stiffness of the drivetrain, and subsequently
        in an equilibrium state between the torque generated by the rotor and a counter torque of the drivetrain, a second rotation angle of the rotor is measured, and
        wherein at least one of the torque generated by the rotor and the total stiffness of the drivetrain is ascertained from the measured values of a first rotation angle and a second rotation angle of the rotor.

11. The method of claim 1, wherein at least one of the torque generated by the rotor and a total stiffness of the drivetrain is ascertained using an equation, the equation reading $M_{e1}=(c/u^2)*(\phi_{R2}-\phi_{R1})$ and $M_{e1}$ being the torque of the electric motor in this case, c being the total stiffness of the drivetrain, u being the transmission ratio of the transmission, $\phi_{R2}$ being the second rotation angle of the rotor, and $\phi_{R1}$ being the first rotation angle of the rotor.

* * * * *